March 16, 1954 F. O. SHOBE 2,672,352
BICYCLE STANDARD RAISABLE BY PEDALING
Filed June 1, 1950
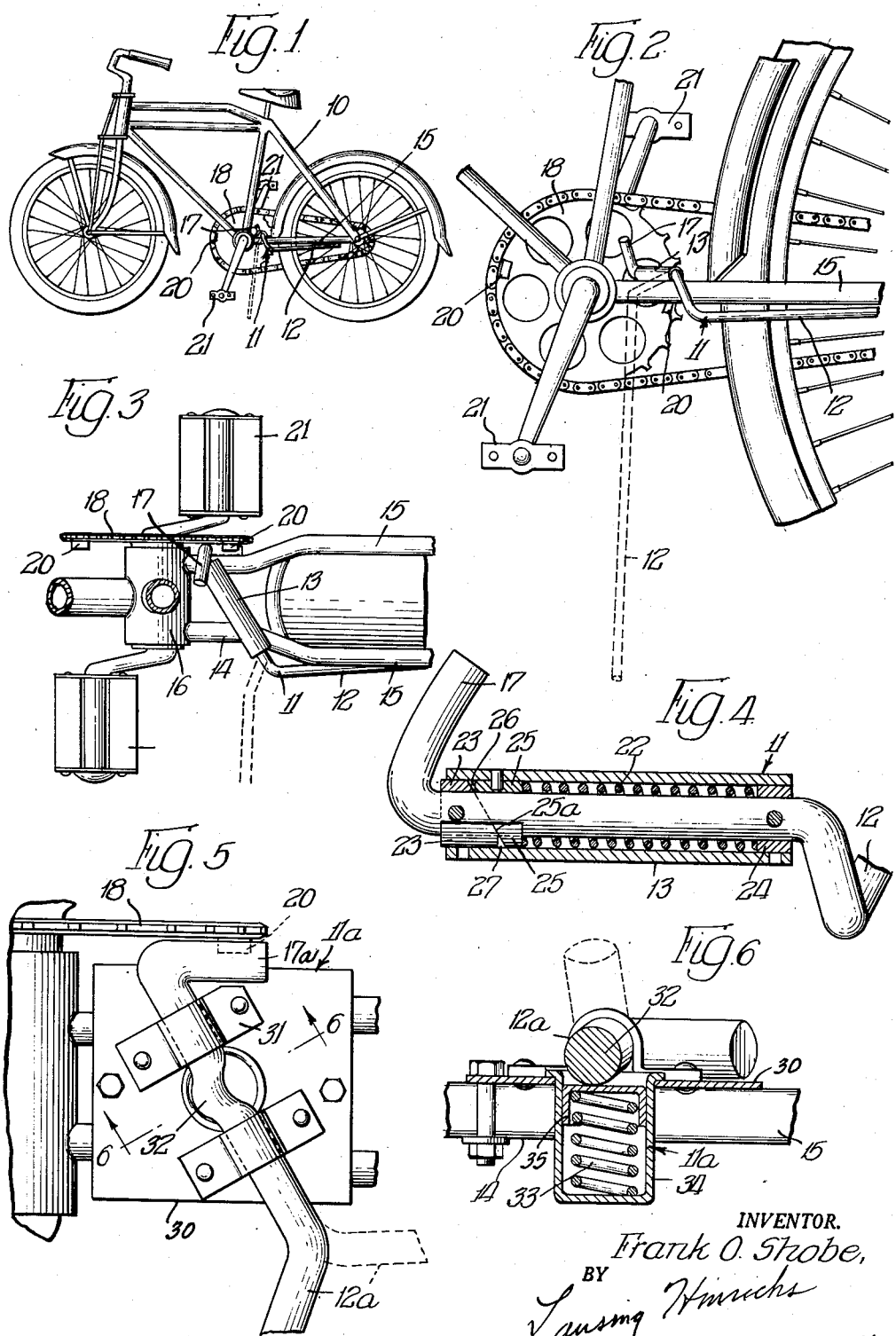
INVENTOR.
Frank O. Shobe,
BY Lansing Hinrichs
Atty.

Patented Mar. 16, 1954

2,672,352

UNITED STATES PATENT OFFICE 2,672,352

BICYCLE STANDARD RAISABLE BY PEDALING

Frank O. Shobe, St. Louis, Mo.

Application June 1, 1950, Serial No. 165,526

6 Claims. (Cl. 280—301)

This invention relates generally to bicycles and more particularly to an improved bicycle standard of the type in which an arm is attached to the bicycle frame near the sprocket bearing and pivots from a raised riding position to a lowered bicycle supporting position wherein it extends downwardly and outwardly from the frame to engage the ground and support the bicycle against tipping.

Such standards usually comprise a bar or arm which is rotatably carried by a bracket or bearing element attached to the rear fork portion of the bicycle frame behind the pedal sprocket bearing, the arm being bent and pivoted in such fashion that in one position it extends rearwardly along the horizontal fork element so that the free end is located near the center of the rear wheel. From this position the arm may be rotated downwardly and forwardly to the lowered position wherein it extends approximately at right angles to the frame and outwardly at an angle of about 30°. Thus when the standard is lowered, the bicycle is supported in a stable position at three points, namely, each wheel and the end of the arm, the bicycle being slightly inclined toward the side of the standard arm so that the center of gravity is located upon the same side of the wheels as the arm.

In conventional standards, the cyclist normally uses his foot to lower or raise the arm, pushing it from one position to the other with his toe or heel. To facilitate this, a spring arrangement is usually provided to urge the arm either toward the carrying position or toward the lowered bicycle supporting position.

It is quite difficult, however, for the rider to raise the standard to the riding position while he is riding the bicycle, because he must remove his foot from the pedal to do so. Moreover, if the standard is constructed so as to extend into the path of the rotating pedal the foot may become entangled in the standard as the pedals are rotated. Since many cyclists, and particularly children, like to ride away from a standing position without stopping to raise the arm, difficulty in raising the arm frequently occurs, with the result that the rider suffers a fall or other accident. The danger is particularly great when riding in a busy street in automobile traffic.

One object of this invention is to provide a standard which will be automatically raised to the riding position as soon as the rider starts to pedal the bicycle and which will not interfere with the action of the pedals or the rider's feet.

Another object is to provide a standard which is actuated by motion of the pedals, the force applied in rotating the pedals as the bicycle is ridden being utilized to raise the standard.

Another object is to provide an automatic standard which cannot be lowered to interfere with the pedals unless they are stationary and which may be actuated entirely by the rider's foot, if desired, the automatic features not interfering in any way with the manipulation.

Another object is to provide an automatic standard which is simple in construction and easy to fabricate, costing no more than conventional standards.

Other objects and advantages of this invention will, of course, present themselves to those familiar with the art on reading the following specification in conjunction with the drawing and the appended claims:

In the drawing:

Fig. 1 is a side view of a bicycle equipped with a preferred embodiment of the standard of this invention;

Fig. 2 is an enlarged side view of the standard;

Fig. 3 is a top view of the standard;

Fig. 4 is a vertical section showing the construction of the standard bearing element;

Fig. 5 is a top view of a modified form of the standard; and

Fig. 6 is a section taken on line 6—6 of Fig. 5.

A conventional bicycle 10 provided with a preferred embodiment of the standard 11 of this invention is shown in Fig. 1 of the drawing. The construction of the standard 11 is best shown in Figs. 2 to 4 in which the elements are enlarged.

The standard 11 comprises a unitary arm 12, preferably formed of a steel rod, and a tubular bearing element 13 in which the arm is journalled. The bearing element 13 is welded or otherwise attached to the bicycle frame 14 at the point where the two rear wheel fork members 15 join the pedal bearing 16.

To provide for outward movement of the arm 12 as it is swung downwardly from the riding position in which it extends rearwardly parallel to the rear fork member 15, the tubular bearing element 13 is attached to the frame at an angle of about 60° to the fore and aft center line of the bicycle 10. The element 13 is preferably horizontal so that it may be readily attached to the tops of the frame members 15. If desired, however, the element 13 may be supported at an angle to the horizontal in a plane perpendicular to the center line, and substantially the same pivotal effect will be achieved.

To provide for automatic raising of the standard, an extending portion 17 of the arm 12 projects through the element 13 and is reversely bent at an angle of about 60°. When the arm 12 is in the lowered position the projection 17 occupies the position shown in broken lines in Fig. 3, extending rearwardly approximately parallel to the rear fork member 15 and almost touching the side of the sprocket wheel 18. When the standard arm 12 is raised, the projection 17 is in the position shown in solid lines in Figs. 1 to 4 of the drawing and extends upwardly and inwardly toward the center of the frame.

The projection 17 cooperates with a pair of lugs 20 carried by the sprocket wheel 18 to raise the standard when the sprocket wheel is rotated by the pedals 21, each of the lugs 20 acting as a cam surface which bears against the projection 17 to rotate it upwardly and raise the standard as the pedals are turned in a counterclockwise direction, as viewed in Fig. 2. As the standard arm 12 rotates away from the lowered position, the end of the projection 17 moves away from the sprocket wheel 18 so that after the arm 12 has moved a short distance the lug 20 is disengaged from the projection, permitting the sprocket wheel to rotate freely.

To move the standard to the full raised position once it has moved part way, a spring and cam arrangement within the bearing element 13 is provided. This tubular element is somewhat larger in diameter than the arm 12, and a coil spring 22 is housed in the resulting annular space surrounding the arm 12. At each end of the straight intermediate portion of the arm 12 a bearing sleeve 23 and 24 is pinned to the arm 12. These sleeves rotate with the arm 12 and are journalled against the inside wall of the element 13. A bushing 25 having a cam surface 25a is pinned to the bearing element 13 adjacent to the sleeve 23, and the spring 22 bears against the bushing 25 and the sleeve 24 to urge the arm 12 to the left as shown in Fig. 4.

The adjacent faces of the bushing 23 and the sleeve 25 are machined on an incline to provide a cam action which tends to rotate the arm 12 to the raised position. As the standard is lowered, the cam action causes the arm 12 to move to the right and increase the compression on the spring 22.

To permit the arm to remain in the lowered position, opposed flat portions 26 and 27 are provided on the inclined faces of the bushing 25 and the sleeve 23, respectively. These flat portions are so disposed as to coincide when the standard is fully lowered. When the flat portions 26 and 27 are in contact, the pressure of the spring 22 exerts no rotating force upon the arm 12. The angular extent of the flat portions is preferably such that when the arm 12 has been raised ten or fifteen degrees, the flat portions are no longer in contact and the action of the spring will raise the arm to the fully raised riding position.

The angular extent of the flat portions 26 and 27 is not critical except that they should not remain in contact after the projection 17 on the arm 12 has moved out of contact with the lug 20 on the sprocket wheel 18 as the arm is raised. If desired, the flat portions 26 and 27 may be given a slight reverse slope in order to urge the standard to the fully lowered position, but this is not always necessary for friction alone is usually sufficient to hold the arm down once it has been lowered.

The fully lowered position of the standard is determined by the projection 17 which serves a dual function as a limit stop. When the standard is lowered, this projection engages the rear fork member 15 of the frame and prevents further rotation of the arm 12.

The above described cam arrangement actually aids in the engagement and disengagement of the lugs 20 and the projection 17. It will be apparent from the drawing that the arm 12 moves toward the sprocket wheel a short distance as the standard is lowered. This moves the projection 17 farther into the path described by the lugs 20. The arm 12 remains in this position as long as the flats 23 and 27 are engaged. However, as the flats separate and the cam action tending to raise the arm becomes effective, the projection is retracted from the path of the lugs 20. This effect assists in rapidly disengaging the arm 12 from the lugs as the projection rotates away from the sprocket wheel 18.

The operation of the standard should be readily apparent from the foregoing description, but the following résumé may prove helpful in understanding the invention:

When the bicycle rider comes to a stop and desires to leave the bicycle, he moves his left foot rearwardly and hooks his toe over the end portion of the arm 12 which is bent outwardly so as to be readily accessible. He then swings his foot downwardly until the standard occupies the position shown in broken lines in Figs. 1 to 3 of the drawing. If desired, this step may be accomplished after dismounting from the bicycle.

As the arm 12 swings downwardly, the cam action of the adjacent faces of the bushing 25 and the sleeve 23 moves the arm 12 toward the sprocket 18 compressing the spring 22. Simultaneously the projection 17 on the arm is rotated to a horizontal position alongside the rear fork member 15, finally checking downward movement of the standard as it engages the member 15. The bicycle may then be tilted slightly and supported on the end of the standard arm 12. On examination of Figs. 1 and 2 it will be noted that in the lowered position the lower end of the standard arm 12 is slightly forward of the upper end. Thus the weight of the bicycle tends to hold the standard in the lowered position instead of tending to raise it as would be the case if the arm 12 slanted rearwardly.

When the cyclist desires to ride the bicycle, he may either raise the standard with his foot in the conventional manner or he may simply mount the bicycle, tilt it to a level position, and pedal off, because the first one-half turn of the pedals 21 will automatically raise the arm 12. As the sprocket wheel turns, one of the lugs 20 will engage the projection 17 and rotate the arm 12 upwardly until the two flat portions 26 and 27 on the bushing 25 and sleeve 23 have moved out of alignment, at which time the force of the spring 22 will raise the standard arm 12 to the riding position.

In the drawing only two lugs 20 have been shown. If desired, a single lug or more than two lugs may be employed, the more lugs that are provided the quicker the standard will be lifted. If a single lug 20 is employed, it should be located approximately in the position of the right-hand lug in Fig. 2 so as to raise the standard out of the path of the pedal 21 in advance of the rider's heel as he rotates the pedals 21.

The lugs 20 are preferably made as small as possible so as not to interfere with the action of the standard as it is lowered, for if a lug is disposed in the path of the projection 17 when the standard arm 12 is lowered, it may prevent the full lowering of the standard. In most cases, however, the projection 17 will merely force the sprocket wheel to rotate backwardly a short distance, applying the rear wheel brake on those bicycles equipped with coaster brakes, and the action of the standard will not be affected.

In Figs. 5 and 6 a modified embodiment 11a is shown in which the standard arm 12a is journalled on a plate 30 bolted to the bicycle frame 14. This embodiment is suitable for use as an accessory and may be installed on almost any bicycle either during or after manufacture. The preferred embodiment 11 may, of course, be similarly modified by supporting the bearing element 13 on a bracket which may be bolted or otherwise attached to the frame.

A pair of U-shaped brackets 31 is riveted to the plate 30 and rotatably support the arm 12a thereon. In this embodiment the rod from which the arm 12a is formed may be completely bent to shape prior to mounting it upon the plate 30. In the previously described embodiment the arm 12 must be assembled in the bearing element 13 before the projection 17 is bent, or the tubular element 13 may be made in two separate halves which are assembled about the arm 12 and clamped or welded together.

A somewhat different arrangement for urging the arm 12a upwardly is provided in the modified embodiment 11a. In this case the arm 12a is provided with an offset portion 32 intermediate the brackets 31 which cooperates with a coil spring 33 housed in a cup member 34 below the plate 30. A piston 35 is slidably received in the bore of the cup member 34, and the compressive force of the spring is transmitted through the piston to the offset 32 of the arm 12a to urge the arm 12a to either the fully raised or the fully lowered position.

In the drawing, the two brackets 31 have been shown as separate elements for purposes of illustration. Actually it is preferred to use a single bracket whose central portion encloses the offset portion 32 and the top of the spring cup 34. When this is done there is little likelihood that dirt will get into the cup member to interfere with the action of the spring 33.

In Figs. 5 and 6 the standard arm 12a is shown in the lowered position in solid lines and in the raised position in broken lines. Instead of using the frame 14 as a limit stop for downward motion of the standard arm 12a, the side of the plate 30 extends sideways toward the sprocket to engage the projection 17a when the standard is fully lowered.

Except for the above described differences and the fact that the arm 12a does not move toward the sprocket 18 when the standard is lowered, the two standards 11 and 11a are identical, the operation of the modified form being substantially the same as the preferred embodiment.

From the foregoing description it will be apparent that a superior bicycle standard has been provided which is automatically and safely raised as soon as the rider starts to pedal the bicycle, or which may be actuated the same as conventional standards.

Various changes and modifications in addition to those set forth herein may be made without departing from the spirit of this invention whose scope is commensurate with the following claims.

What is claimed is:

1. In a bicycle standard for a bicycle driven by a sprocket, the combination including a bearing element supported by the frame of the bicycle in a horizontal plane and making an acute angle with the fore and aft center line of said frame, an arm journalled in the bearing element for supporting the bicycle in one position and movable to a second riding position, an extension on said arm making an acute angle with the journalled portion thereof, and means on the sprocket for engaging the extension to move said arm away from the first mentioned position as said sprocket is rotated.

2. In combination with a bicycle having a pedal driven sprocket, a standard comprising an arm pivotally attached to the frame of said bicycle in close proximity to said sprocket, one end of said arm normally extending rearwardly parallel to the rear fork of the frame and being rotatable to a lowered position extending downwardly and outwardly from the point of attachment to said frame so as to engage the ground on the opposite side of the center line of said bicycle from the sprocket, a projecting portion on said arm on the end adjacent to said sprocket, a lug on the inside of said sprocket disposed approximately 90° ahead of the pedal on the same side as said arm for engaging said projecting portion to rotate the arm rearwardly and upwardly from the lowered position ahead of said last mentioned pedal as the sprocket is rotated to move the bicycle forward, and means for urging said arm to the normal position parallel to the rear fork element, said last mentioned means including a fixed inclined cam surface and a resilient element for urging another surface carried by said arm against said cam surface, the inclination of said inclined surface being such as to cause the projecting portion on said arm to move toward the sprocket as the arm is lowered.

3. In a bicycle standard for a bicycle having a pedal driven sprocket, the standard being of the type in which a pivoted arm is supported upon the bicycle frame behind the sprocket bearing at an acute angle to the fore and aft center line and pivots downwardly and forwardly to an extended bicycle supporting position from a raised position alongside the rear fork, the combination with said standard arm and sprocket of a projection on said arm and a lug on the side of the sprocket for engaging the projection when the sprocket is rotated to move the bicycle forward to raise the standard from the lowered position, said lug being disposed approximately 90° ahead of the pedal which is on the same side as said arm.

4. A kick stand for bicycles comprising, in combination with a bicycle frame having rearwardly extending fork elements, a pedal crank journal joining said elements, a drive sprocket and pedal crank assembly rotatable in said journal, of a tubular bearing secured to said fork elements at an angle to the axis of said journal, an arm formed of rod stock including a portion rotatably journaled in said bearing, a portion extending outward beyond said bearing to serve as a support arm, said outward extending portion being swingable about said bearing axis as a center between utility and withdrawn position, and another portion extending into the path of the drive sprocket of said assembly and engageable with side portions of said drive sprocket during utility position of said arm and rotatable to an out of engagement position with said sprocket as it approaches said withdrawn position.

5. In a bicycle standard for a bicycle having a sprocket driven by two pedals disposed on opposite sides of the bicycle and disposed at 180° with respect to each other, the standard being of the type in which a pivoted arm is supported upon the bicycle frame behind the sprocket bearing at an acute angle to the fore and aft center line thereof and pivots downwardly and forwardly from a raised position alongside the rear fork to a substantially vertical and laterally extended bicycle supporting position, the combination with said standard arm and sprocket of a projection on said arm and a lug on the side of the sprocket for engaging the projection when the sprocket is rotated to move the bicycle forward to raise the standard from the lowered position, said lug being disposed to engage said projection at approximately the time the pedal on the side of the bicycle opposite the sprocket reaches its lowest point when the sprocket is rotated to move the bicycle forward.

6. In combination with a bicycle driven through a sprocket wheel by a pedal crank journalled in the frame on an axis disposed transversely to the frame, support means carried by the frame and journalled on an axis disposed at an angle with respect to the crank axis, said support means including a support arm on one side, an intermediate offset portion, and a lever projection on the other side of the last said journal, said support arm, intermediate offset portion, and lever projection being integrated and arranged for movement as a unit in which the support arm is rotatable from a fully retracted position to a supporting position and the lever projection simultaneously therewith is moved to a position removed from the sprocket to a position adjacent said sprocket, means carried on said sprocket for engaging said lever projection in the said adjacent position to drive said lever projection from its position adjacent the sprocket and simultaneously therewith move said support arm from its supporting position to a position intermediate said supporting position and said fully retracted position, and resilient means engaging the offset portion of said support means for urging said arm to either one of both of its alternative positions from said intermediate position.

FRANK O. SHOBE.

References Cited in the file of this patent
UNITED STATES PATENTS

| Number | Name | Date |
|---|---|---|
| 602,134 | Hawkes | Apr. 12, 1898 |
| 1,054,045 | Smith | Feb. 25, 1913 |
| 2,197,936 | Kraeft | Apr. 23, 1940 |
| 2,395,148 | Schwinn | Feb. 19, 1946 |